July 21, 1959

A. W. NYSTROM 2,895,569

SAFETY CAR BLOCK

Filed Jan. 8, 1957

2 Sheets-Sheet 1

ARTHUR W. NYSTROM
INVENTOR

BY John A. Mawhinney

ATTORNEY

July 21, 1959  A. W. NYSTROM  2,895,569
SAFETY CAR BLOCK

Filed Jan. 8, 1957 2 Sheets-Sheet 2

ARTHUR W. NYSTROM
INVENTOR

BY John A. Mawhinney
ATTORNEY

United States Patent Office 2,895,569
Patented July 21, 1959

2,895,569
SAFETY CAR BLOCK
Arthur W. Nystrom, Naples, Idaho
Application January 8, 1957, Serial No. 633,080
6 Claims. (Cl. 188—32)

The present invention relates to a safety car block and has for an object to provide a device of this kind which is adapted to be placed against the wheel of a vehicle, such as an automobile, truck or the like, to prevent movement of the vehicle.

Another object of the present invention is to provide a device of this character adapted to be used for restraining the vehicle against movement forwardly, backwardly and sidewise by using a pair of the devices, one in front of a wheel and the other in the rear of the same wheel or another wheel of the vehicle.

A further object of the present invention is to provide a car block capable of being placed in an initial position adjacent the tire of the wheel of the vehicle and then being adjusted into firm engagement with the tire of the wheel to prevent movement of the vehicle.

A still further object of the present invention is to provide a device of this type which is provided with means for penetrating the supporting surface upon which the vehicle wheel and the device are supported so that there is no likelihood of the device shifting forwardly, rearwardly, or sidewise.

The present invention aims to provide a car block which is adapted to prevent movement of the vehicle to which it is applied when the vehicle is parked on a steep grade, or is being jacked up for the purpose of changing a tire or for applying anti-skid chains to the tire.

The present invention also aims to provide a device of this character which can be collapsed to a flat position and releasably locked in its collapsed position for storing in the trunk compartment of the vehicle and yet is capable of being quickly and easily adjusted to tightly and firmly engage the tread of a vehicle tire by the use of the conventional wheel lug wrench which is carried as part of the equipment of the vehicle.

The present invention contemplates the provision of a car block which comprises relatively few parts, is inexpensive to manufacture and in which there are no parts subject to wear and breakage.

With the foregoing and other objects in view, the invention will be hereinafter more fully described and more particularly pointed out in the appended claims.

Figure 1:
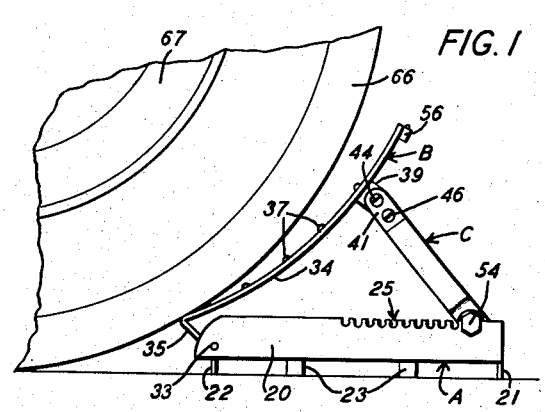
Figure 2:
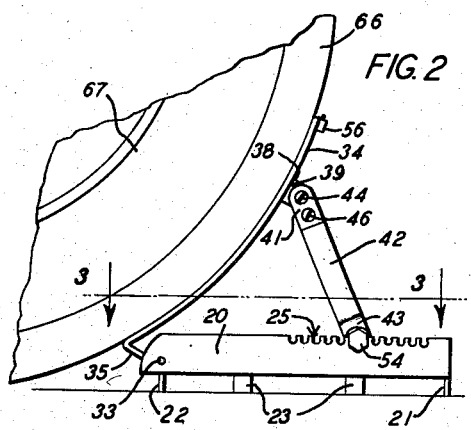
Figure 3:
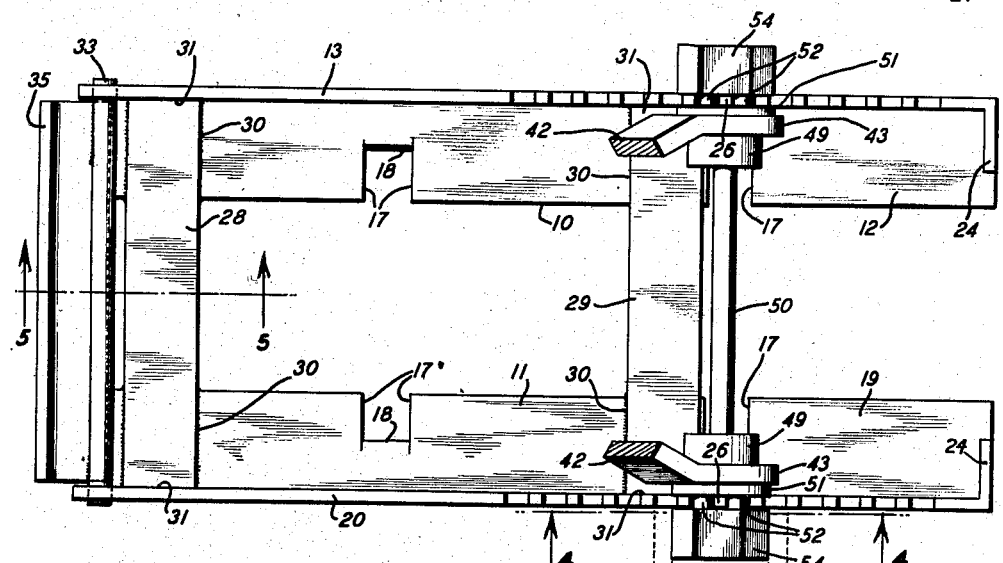
Figure 4:
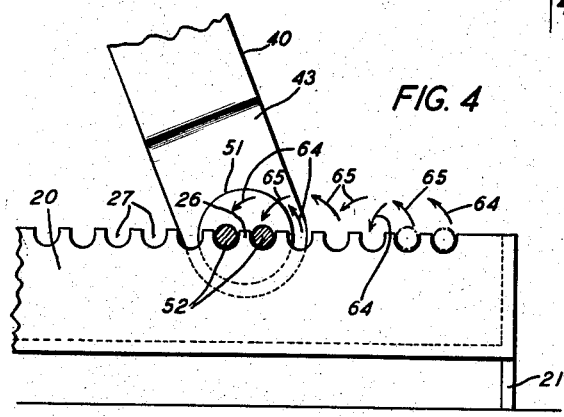
Figure 5:
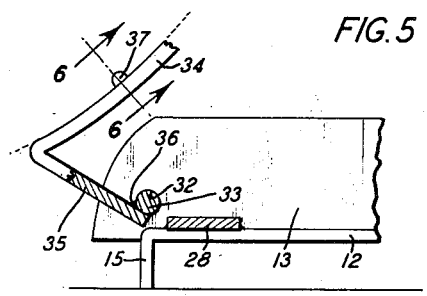
Figure 6:
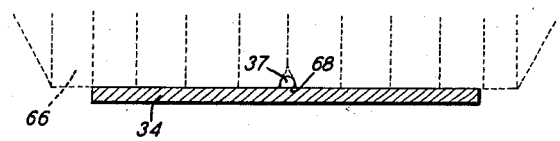
Figure 7:
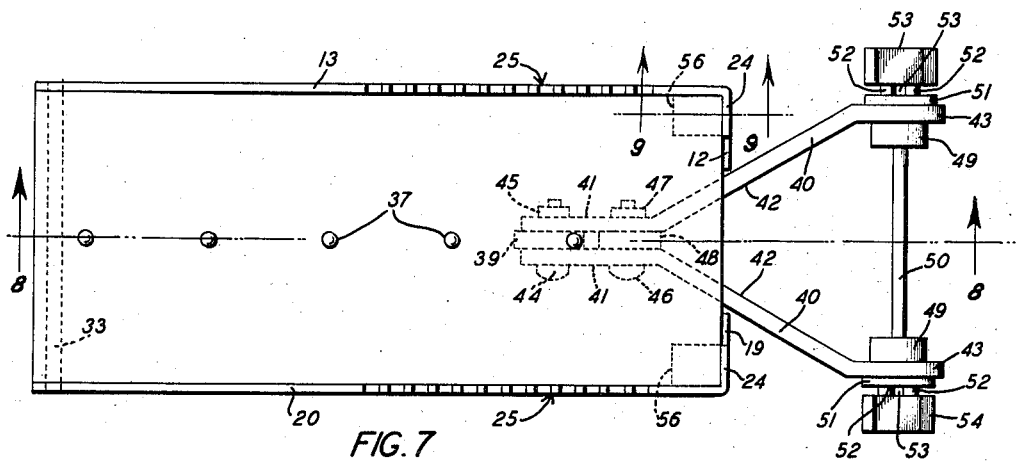
Figure 8:
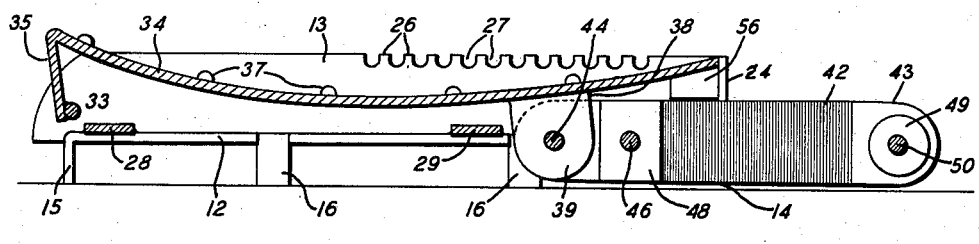
Figure 9:
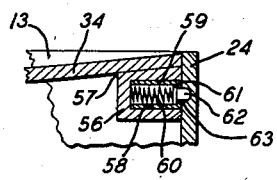

In the drawings in which the same parts are denoted by the same reference numerals throughout the several views, Figure 1 is a side elevational view of a car block constructed in accordance with the present invention and shown in its initial position of application to the tire of a vehicle, Figure 2 is a view similar to Figure 1 but showing the car block in its final position of application to the tire of the vehicle, Figure 3 is a sectional view taken on the line 3—3 of Figure 2, on an enlarged scale, Figure 4 is a sectional view taken on the line 4—4 of Figure 3, Figure 5 is a sectional view taken on the line 5—5 of Figure 3, Figure 6 is a sectional view taken on the line 6—6 of Figure 5, Figure 7 is a top plan view of the device in collapsed condition, Figure 8 is a sectional view taken on the line 8—8 of Figure 7, and Figure 9 is a sectional view on an enlarged scale taken on the line 9—9 of Figure 7.

Referring more particularly to the drawings, A generally indicates a supporting or base member, B generally indicates a pressure or bearing plate pivotally secured to the base member A, and C generally indicates an adjusting member pivotally secured to the plate B. The supporting or base member A comprises two longitudinally extending spaced apart side pieces 10 and 11.

The side piece 10 is of angle iron shape in cross section and comprises a horizontal flange 12 and a vertical flange 13 formed at the outer side edge of the flange 12. The horizontal flange 12 is longer than the vertical flange 13 and the rear end portion of the horizontal flange 12 is bent downwardly to provide a supporting leg or lug 14, as can be seen from Figure 8 of the drawings, which extends crosswise or transversely of the base member A. At its forward end the side piece 10 is slit along the juncture of its horizontal and vertical flanges for a short distance to form a forward free end portion on the horizontal flange 12, which is bent downwardly to provide a forward supporting leg or lug 15, as is shown in Figure 8 of the drawings.

Intermediate the ends of the flange 12 intermediate supporting legs or lugs 16 are formed thereon. Each leg 16 is formed by cutting the horizontal flange 12 transversely along two spaced apart parallel lines, as indicated at 17, for substantially half the width of the flange 12 and bending the cut-away portion of the flange along its line of juncture 18 with the flange.

The side piece 11 is constructed in the same manner as the side piece 10 and comprises a horizontal flange 19, a vertical flange 20, a rear supporting leg or lug 21, a forward supporting leg or lug 22 and intermediate supporting legs or lugs 23. Each of the vertical flanges 13 and 20 has its rear end portion bent inwardly to provide rear walls 24 which have a width approximately one-half the width of the horizontal flanges 12 and 19. A portion of the upper edge of each of the vertical flanges 13 and 20 are of rack bar formation, as indicated generally at 25, comprising teeth 26 and spaces 27 between the teeth. The rack bar 25 of each flange 13 and 20 extends longitudinally of each flange from a substantially mid point rearwardly and terminates short of the rear wall 24 thereof.

The side pieces 10 and 11 are held in spaced apart parallel relationship by a forward cross-brace 28 and a rearward cross-brace 29. The opposite end portions of each brace 28 and 29 rest upon the horizontal flanges 12 and 19 and are secured thereto in any suitable manner as by welding 30. The opposite end of each brace 28 and 29 abuts the inner face of the adjacent vertical flanges 13 and 20 and is secured thereto in any suitable manner as by welding 31.

Adjacent its forward end each vertical flange 13 and 20 is provided with an aperture 32, through which extends a pivot pin 33. The pressure or bearing member B comprises an elongated plate 34 which is arcuate in longitudinal section. The forward end portion of the plate 34 is bent downwardly to provide a flange 35. The width of the plate is such that it will be accommodated within the space between the vertical flanges 13 and 20 when in the collapsed condition shown in Figure 8 of the drawings. The pivot pin 33 is secured to the inner face of the lower end portion of the flange 35 as by welding 36 or the like, and the opposite end portions of the pivot pin 33 are upset exteriorly of the outer faces of the vertical flanges 13 and 20 to prevent sidewise or transverse movement of the pin and the pressure plate 34. The upper or outer surface of the plate 34 is provided with a longitudinally extending row of buttons or abutments 37. The inner or under face of the plate 34 has secured thereto as by welding 38, or the like, adjacent its rear end and apertured lug 39.

The adjusting member C is pivotally attached to the lug 39 and is of yoke formation. The member C comprises a pair of arms 40, each of which has a substantially flat inner end portion 41 and an intermediate outwardly diverging portion 42, which terminate in flat outer end portions 43 which are substantially parallel and spaced outwardly from the flat portions 41. Adjacent its inner end, each inner flat portion 41 is provided with an aperture which are in alignment with each other and with the aperture in the lug 39 to receive therethrough a securing bolt or other fastening element 44 which is held in place by a nut 45 whereby the adjusting member C is pivotally and detachably secured to the lug 39. Outwardly of the bolt receiving apertures, each inner flat portion 41 is provided with a second aperture which are in alignment to receive therethrough a bolt 46 held in place by a nut 47. An apertured spacer 48, which may be in the form of a small block of metal or the like, is interposed between the outer parts of the inner flat portions 41 and the bolt 46 extends therethrough to retain the spacer 48 in position.

The outer end flat portions 43 of the arms 40 are provided with aligned apertures which rotatably receive bearing members 49. The bearing members 49 are connected together for rotation as a unit by a shaft 50 to the opposite end portions of which the bearing members 49 are fixedly secured as by sweating, welding or the like. Each bearing member 49 has an enlarged annular flange 51 formed on its outer end which is adapted to engage the outer face of its outer end flat portion 43 for preventing the escape of the bearing members 49 from the apertures in the portions 43.

Each flange 51 is secured for rotation therewith to the inner ends of a pair of spaced apart pinion bars 52 having a space 53 therebetween. A non-circular rotating or turning member 54 is secured to the outer ends of the bars 52 for rotation therewith. The outer contour of the members 54 may be of any desired configuration so that a wrench will fit thereon for effecting rotation of the member 54, but in the present illustrations the members 54 are hexagonal so that a conventional automobile lug wrench, indicated at 55, will fit the members 54 for effecting rotation thereof.

The rack bars 25, the member C and the pinions bars 52 comprise means for effecting the movement of the pressure member with respect to the base member.

For the purpose of retaining the device in the collapsed position shown in Figures 7, 8 and 9, there is provided a spring catch which is illustrated in Figure 9 of the drawing. One of these spring devices is provided at each side of the bearing plate 34. Each spring catch comprises a block of metal or the like 56 which is secured to the inner face of the plate 34 adjacent the rear end portion thereof. The blocks 56 may be secured to the plate 34 by welding 57 or the like and each block is provided with a socket 58 in which is positioned a liner 59 within which is housed a coil spring 60. One end of the coil spring 60 abuts the bottom of the socket 58 and the opposite end of the spring bears against a collar 61 formed on the inner end of a locking pin 62. The locking pin 62 is normally urged by the spring 60 into a recess 63 formed in the inner face of the rear wall 24 of the base member A.

In the operation of the device, assuming that it is in its collapsed condition, as illustrated in Figures 7, 8 and 9, and it is desired to erect it to its fully operative position, as illustrated in Figure 2, the device will be moved to the position illustrated in Figure 1 by holding the base member in one hand and grasping the shaft 50 with the other and swinging the bearing member B and the adjusting member C upwardly to the position shown in Figure 1. With the bars 52 received by the two rearmost spaces 27 of the rack bars 25 and the rearmost teeth 26 of the rack bars received by the spaces 53 between the bars 52. The device will then be placed upon the road or ground immediately in front of or behind the wheel 67 of the vehicle with the forward edge portion of the plate 34 engaging the tread of the tire 66. Pressure plate 34 can be moved into firm gripping engagement with the tire 66 by means of the lug wrench 55 which is placed over one of the rotating members 54 and the lug wrench will be rotated in the proper direction so as to move the bars 52 in the direction and sequence indicated by the arrows 64 and 65, as shown in Figure 4 of the drawings.

In this movement the forward bar 52 will serve as a pivot for the rearward bar 52 to swing about and enter the space 27 of the rack bar 25 immediately in front of the forward bar 52. This forward bar 52 will then be swung around as indicated by the arrows 65, since what was the rear bar 52 will now serve as a pivot. This sequence of movement of the bars 52 will be continued as the bars walk along the rack bar 25 until the pressure plate 34 is firmly and frictionally engaged with the tread of the tire 66, as shown in Figure 2 of the drawings. In this way the pressure plate can be brought into such engagement with the tread of the tire 66 that it will prevent any movement of the vehicle in a forward or backward direction, depending upon whether the device is applied forwardly or rearwardly of the wheel of the vehicle. In fact, the power generated by the use of the lug wrench 55 and the rack bars 25 and bars 52 is of such a nature that the vehicle can be moved by their application to the wheel of the vehicle.

If the vehicle is positioned on an incline which might cause forward movement of the vehicle, the device will be placed in front of the wheel, whereas, if the vehicle is on an incline which might cause rearward movement of the vehicle, the device is applied rearwardly of the wheel. While one of these devices is sufficient to prevent movement of the vehicle in a forward or rearward direction, two devices could be used with more effective results. If the vehicle is on level ground, one of these devices should be placed forwardly of the wheel and a second device should be placed rearwardly of the wheel.

When the pressure plate 34 has been moved to the position illustrated in Figure 2, the buttons 37 on the pressure plate will be received in the recesses 68 of the tire 66 so that the vehicle wheel will be prevented from slipping sideways from the pressure plate 34.

It will be noted that the rear supporting legs 21 and the forward supporting legs 22 have their greatest width extending transversely of the tire tread and the lower free edges of these legs may be sharpened so that they will penetrate the ground for ice or snow to resist forward or backward movement of the vehicle. It will also be noted that the intermediate legs 23 have their greatest width extending in a direction at substantially right angles to that of the greatest width of the legs 21 and 22 and the lower free edges of these legs 23 may also be sharpened so that they will penetrate the ground, ice or snow and will prevent lateral or sidewise movement of the car block so that the tire 66 cannot slip sidewise therefrom. These legs 23 therefore cooperate with the buttons 37 on the pressure plate 34 to prevent any relative sidewise lateral movement of the tire 66 and the car block.

The locking pin 62 is urged with sufficient force by the spring 60 into the recess 63 so that the locking pin 62 will retain the device in its collapsed condition against accidental dislodgment therefrom and yet the locking pin 62 can be moved out of the recesses 63 by an upward pull on the shaft 50.

This device is useful when a car is parked on an incline to supplement the action of the brakes and it is also useful particularly when it is necessary to jack up one or more of the wheels for the purpose of changing a tire or for applying antiskid chains or devices to the tires of the vehicle. The provision of the racks 25 and pinions constituted by the bars 52 is of great importance since this not only provides for adjustment of the pressure plate 34, but it provides for such a firm engagement of the pressure plate against the tread of the tire that there is no movement whatsoever possible of the vehicle forward, backward or sidewise. At the same time, there are no parts to wear out or to become out of order.

When it is desired to move the car block from engagement with the tire 66, it is only necessary to reverse the original direction of rotation of the lug wrench so that the bars 52 will walk along the rack bars 25 in a direction opposite to that indicated by the arrows 64 and 65 in Figure 4 of the drawings. This will move the pressure plate 34 away from the tire 66 and the bars 52 may then be removed from engagement with the rack bars 25 by pulling upwardly on the shaft 50 and the pressure plate B and the adjustment member C may then be moved to their fully collapsed position shown in Figures 7, 8 and 9 of the drawings. The device is then ready to be stored in the trunk compartment or other suitable place in the vehicle.

It is obvious that various changes and modifications may be made in the details of construction and design of the above specifically described embodiment of this invention without departing from the spirit thereof, such changes and modifications being restricted only by the scope of the following claims.

What I claim is:

1. A safety car block comprising a base member, a pressure member pivoted to said base member for movement between a collapsed position within the confines of the base member and an operative extended position in engagement with the tire of a vehicle wheel, resilient means on said base member and pressure member for releasably holding the pressure member in its collapsed position, and means for effecting the movement of the pressure member with respect to the base member comprising at least one rack bar on the base member and pinion means connected to said pressure member at a distance from the pivot between the base and pressure members, said pinion means comprising a pair of spaced-apart pinion bars adapted to enter the spaces between the teeth of the rack bar and to serve alternately as a pivot for the step-by-step travel of the pinion means along the rack bar.

2. A safety car block comprising a base member, a pressure member pivoted to said base member for movement between a collapsed position within the confines of the base member and an operative extended position in engagement with the tire of a vehicle wheel, and means for effecting the movement of the pressure member with respect to the base member comprising at least one rack bar on said base member and pinion means connected to said pressure member at a distance from the pivot between the base and pressure members, said pinion means cooperating with the teeth on the rack bar and including means for locking the pinion means in its adjusted position.

3. A safety car block as claimed in claim 2, wherein said base member and said pressure member are provided with cooperating means for preventing movement thereof transversely of the vehicle.

4. A safety car block as claimed in claim 2, wherein said base member is provided with means for preventing movement of the car block longitudinally of the vehicle.

5. A safety car block as claimed in claim 2 wherein said movement effecting means includes a laterally extending operating element accessible from the outer side of the car.

6. A safety car block as claimed in claim 2 wherein resilient means are provided on the base and pressure members for releasably holding the pressure member in its collapsed position and for releasably holding the movement effective means in an inoperative position.

References Cited in the file of this patent

UNITED STATES PATENTS

| | | |
|---|---|---|
| 1,276,430 | Smith | Aug. 20, 1918 |
| 1,436,766 | Kendrick | Nov. 28, 1922 |
| 1,768,265 | Nicholls | June 24, 1930 |
| 2,316,178 | Morgensen | Apr. 13, 1943 |
| 2,581,619 | Arrigo | Jan. 8, 1952 |